Patented July 5, 1927.

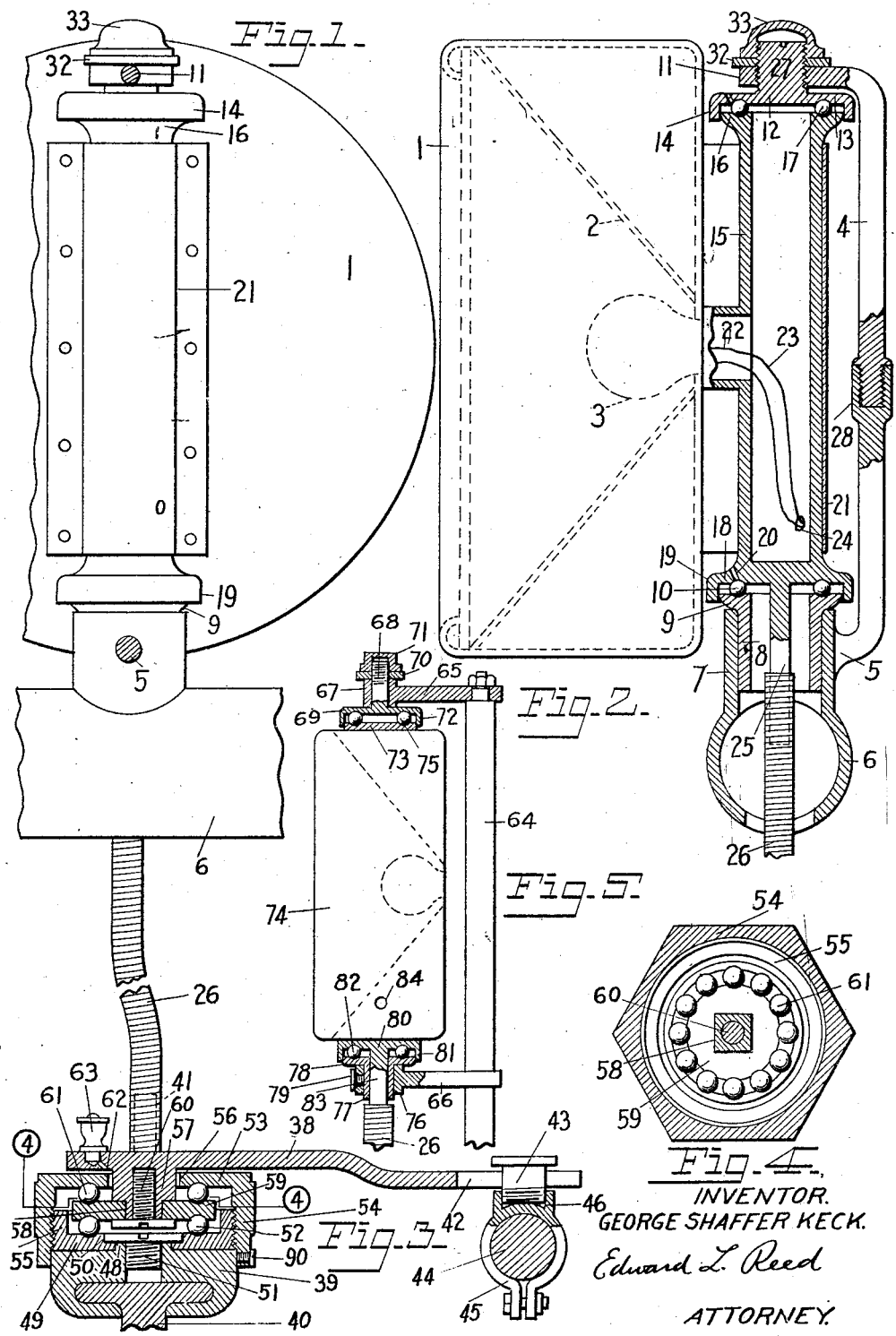

1,634,580

UNITED STATES PATENT OFFICE.

GEORGE SHAFFER KECK, OF PASADENA, CALIFORNIA, ASSIGNOR TO THE INTERNATIONAL CONTROLLED LAMP COMPANY, OF WILMINGTON, DELAWARE, A CORPORATION OF DELAWARE.

DIRIGIBLE HEADLIGHT.

Application filed July 19, 1924. Serial No. 726,944.

This invention relates to dirigible headlights and one object of the invention is to provide a simple efficient headlight which will be controlled by the steering mechanism to cause the light to be always projected directly in front of the automobile, whether the latter is moving forwardly in a straight line or is making a turn.

A further object of the invention is to provide such a device having improved means for rotatably supporting the headlight.

A further object of the invention is to provide in such a device an improved actuating mechanism for transmitting motion from the steering mechanism to the headlight.

Other objects of the invention will appear as the device is described in detail.

In the accompanying drawings Fig. 1 is a rear elevation, partly broken away, of a headlight and its supporting device; Fig. 2 is a side elevation of the same with the supporting device in section; Fig. 3 is a sectional detail view of the actuating mechanism; Fig. 4 is a section taken on the line 4—4 of Fig. 3; and Fig. 5 is a side elevation, partly in section, of a modified form of mounting device for the headlight.

In these drawings I have illustrated one embodiment of my invention, together with a slight modification thereof, and have shown the same as designed for application to a headlight of ordinary construction but it will be understood that the device may be adapted to headlights of various kinds and may be so designed as to adapt it to automobiles of different kinds, without departing from the spirit of the invention.

In that form of the device here shown the headlight proper, as distinguished from the supporting and actuating devices, is shown as comprising a casing 1 having mounted therein a reflector 2 and a lamp 3. This headlight is carried by a suitable support which is rotatable about a substantially vertical axis to permit the headlight to be turned from one position to another. The headlight and its mounting device are carried by a suitable supporting structure which is mounted upon a fixed part of the automobile. As here shown, this supporting structure comprises an upright member 4 having at its lower end a laterally extending portion 5 which is connected with a transverse member 6 extending across the automobile in front of the radiator. In the present instance, the transverse member 6 is in the form of a tubular rod which may be mounted at its ends on the respective fenders or upon other fixed parts of the automobile. It will be understood that ordinarily two headlights are employed and consequently the transverse member 6 will be provided with two upright members 4 arranged near the respective ends thereof. Inasmuch as the means for mounting and actuating both lamps are identical I have here shown and will now describe but one of them.

In the present construction the tubular transverse member 6 is provided with an upwardly extending boss 7, to which the arm 5 of the upright member 4 is rigidly secured, and in this boss is mounted a bearing member. This bearing member is here shown in the form of a short tube 8 fitting snugly within the boss 7 and having its upper end enlarged, as shown at 9, to form a bearing surface, which is preferably provided with a ball race to receive bearing balls 10. At its upper end the upright member 4 is provided with a second transverse member or arm 11 which carries, and, in the present instance is adjustably secured to, an upper bearing member 12 which is arranged in substantially vertical alinement with the lower bearing member 8. This upper bearing member is here shown in the form of a disk having on its lower side a bearing surface 13 provided with a ball race and also having an annular flange 14 depending from the circumferential edge thereof. Interposed between the two bearing members is a headlight supporting member 15 having at its respective ends parts adapted to cooperate respectively with the lower and upper bearing members 8 and 12. The supporting member 15 is preferably in the form of a hollow standard and has its upper end enlarged, as shown at 16, to provide a bearing member adapted to lie within the flange 14 of the upper bearing member. This enlarged upper end of the supporting member is provided with a ball race to receive bearing balls 17 which are interposed between the same and the upper bearing member. The lower end of the supporting member is also enlarged, as shown at 18, and has a circumferential flange 19 to receive the enlarged upper end of the bearing member 8. The enlarged end 18 is also provided with ball races to receive the bearing balls 10 of the lower bearing. The bearings may be assembled and adjusted in any suitable manner and, in the present device, the upper bearing member is secured to the arm 11 by means of a screw threaded stud 27 which extends upwardly from the disk 12 through an opening in the arm 11 and is held in adjusted positions in said arm by a nut 32 and a lock nut 33, the latter being preferably in the form of a cap to enclose the end of the stud. The width of the flange 14 is such that when the disk is moved up against the arm the flange will clear the upper end of the supporting member 15 and may be moved laterally relatively thereto. The arm 11 is capable of swinging movement to permit the bearing member 12 to be moved into and out of alinement with the supporting member and, as here shown, the upright member 4 is formed in two parts, one of which is provided with a screw threaded socket 28 to receive the adjacent end of the other part. If desired, the enlarged end 18 of the supporting member 15 and the upper bearing member 12 may be provided with openings 20 which lead to the respective ball races to provide means for lubricating the bearings. The headlight is rigidly secured to the supporting member, which, in effect, forms a part of the headlight proper, and the point of support is arranged between the upper and lower bearings. In the construction shown in Figs. 1 and 2 the casing of the headlight is secured to the tubular supporting member by means of an elongated band or sleeve 21 which is rigidly secured to the casing 1, and which fits snugly about the supporting member and may, if desired, be brazed or otherwise secured thereto. The socket for the lamp 3 is arranged in line with an opening 22 in the tubular supporting member through which extend the wires 23 which are led into the supporting member through an opening 24 formed in the supporting member 15. Rotatory movement may be imparted to the supporting member and the headlight from the steering mechanism in any suitable manner but, preferably, the supporting member has connected therewith a downwardly extending stud 25 with which is connected the upper end of a flexible shaft 26 the opposite end of which is connected with a suitable actuating device which is operated by the steering mechanism.

The flexible shaft 26 extends downwardly and rearwardly from the headlight support and has its lower end operatively connected with an actuating member mounted on the axle of the automobile. This actuating member is here shown as an arm 38 pivotally mounted on a bracket 39 which is rigidly secured to the axle 40. The bracket 39 may be secured to the axle in any suitable manner but is here shown as a band which embraces the upper portion of the axle and is brazed thereto. The flexible shaft is connected with the arm 38 in line with the axis of that arm and, as here shown, the arm is provided with an upwardly extending axial stud 41 to which the lower end of the shaft is secured. The outer end of the arm 38 is slotted, as shown at 42, and adapted to embrace a stud 43 rigidly secured to and extending upwardly from the transversely movable drag bar 44 of the steering mechanism. As here shown, a connecting member is mounted on the drag bar to support the stud thereon. Preferably this connecting member is in the form of a split band 45 clamped about the bar and having at its upper side a screw threaded boss 46 into which the stud 43 is screw threaded, this being for the purpose of facilitating the assembly of the device.

The actuating member or arm 38 may be pivotally mounted on the bracket 39 carried by the axle 40, in any suitable manner and, in the present device, I have interposed between the bracket and the arm a ball bearing of such a construction that it is well adapted for this purpose and can be easily assembled. As here shown, the supporting bracket 39 is provided with a short upwardly extending boss 48 having an internal screw thread and a non-circular or square exterior contour. Supported on the bracket 39 is a lower bearing 49 having a central opening shaped to fit snugly on the boss 48, preferably with a driving fit. This bearing member is provided in its upper surface with an annular recess 50 extending about the central opening therein and of such a depth that its bottom will be substantially flush with the upper edge of the boss 48. A screw 51 is threaded into the boss and has its head seated in the recess 50 so as to clamp the bearing member 49 onto the bracket 39. The upper surface of the bearing member 49 has a ball race to receive bearing balls 52. An upper bearing member 53 is arranged above the lower bearing member 49 and provided with a circumferentially depending flange 54 which is screw threaded onto a corresponding flange 55 which extends upwardly from the lower bearing member. The upper bearing member 53 is provided with a central opening 56, through which extends a stud 57 rigidly secured to and depending from the actuating arm 38. The upper portion of the stud is cylindrical in form and extends loosely through the opening 56 in the upper bearing member, and the lower portion of the stud is non-circular or squared, as shown at 58. Interposed between the upper and lower bearing members is a third or intermediate bearing member 59 having a squared opening to receive the lower end 58 of the stud 57, to which it is secured by means of a screw 60 which is threaded into a screw threaded socket in the stud 57 and has its head overlapping the inner edge of the intermediate bearing member 59. The intermediate bearing member is provided in both faces thereof with ball races arranged concentrically to the axis thereof to receive the bearing balls 52 which rest upon the lower bearing member and to support bearing balls 61 between the upper side of the intermediate bearing member and the upper bearing member. When the upper bearing member has been screw threaded onto the lower bearing member to properly adjust the friction on the balls the upper surface of the upper bearing member will be spaced slightly from the lower surface of the actuating arm 38 so that there will be no frictional contact between these members. If desired, the arm 38 may be provided with a lubricating port 62 connected at its upper end with a lubricant receptacle 63 and communicating at its lower end with the opening 56 about the stud 57. In assembling this bearing the lower bearing member is first attached to the bracket 39, the actuating arm is then inverted, the upper bearing member placed in position about the stud 57, the balls arranged in the ball races and the intermediate bearing member then secured to the end of the stud by means of the screw 60. The bearing arm is then restored to its normal position and the upper bearing member screw threaded onto the lower bearing member a distance sufficient to give the proper adjustment to the bearing, in which position it may be secured in any suitable manner, as by a set screw 90 extending through the flange 54 and engaging the bracket 39. The arm is then properly positioned with relation to the drag bar 44 and the stud 47 is inserted through the slot 42 and screw threaded into the connecting member 45. The flexible shaft is then secured to the stud 41 and the assembly is complete.

It will be obvious that the manner of mounting the headlight on the supporting structure may take various forms and in Fig. 5, I have shown a modification of this mounting. As there shown the supporting structure comprises an upright member 64 which may be secured either to the transverse bar 6 or to any other fixed part of the automobile. Rigidly secured to this upright member are laterally extending arms 65 and 66 which are spaced apart in substantially vertical alinement. The upper arm 65 is provided at its outer end with a screw threaded socket 67 in which is threaded a stud 68 having at its lower end a bearing member 69. The upper end of the stud extends beyond the socket 67 and is held in position by means of a nut 70 and a lock nut 71, which is preferably in the form of a cap to enclose the upper end of the stud. The bearing member 69 has a depending circumferential flange 72 to receive a cooperating bearing member 73 which is rigidly secured to the top wall of the casing of the headlight, which is shown at 74, the two bearing members being provided with ball races to receive bearing balls 75. The lower arm 66 of the supporting structure is also provided with a socket 76 but, in the present instance, this socket is not screw threaded but is smooth and adapted to receive a hollow boss 77 depending from a circular bearing member 78, which is secured in position on the arm by means of a set screw 79 extending through the socket 76 into engagement with the boss 77. A bearing member 80 is rigidly secured to the lower end of the headlight casing and provided with a depending flange 81 to embrace the bearing member 78 and both bearing members have ball races to receive balls 82. The bearing member 80, which is carried by the casing, has a stud or pin 83 rigidly secured thereto and extending through and beyond the hollow boss 70 to enable it to be connected with the flexible shaft 26. The wires may be led into the headlight casing in any suitable manner but, as here shown, the casing is provided in one wall thereof with an opening 84 through which the wires are passed.

The operation of the device will be readily understood from the foregoing description of the several parts thereof and it will be apparent that I have provided a simple highly efficient dirigible headlight, the position of which will be positively controlled by the operation of the steering mechanism. The device as a whole is of such a construction that there will be very little friction between the several parts thereof and no likelihood of these parts binding or the parts becoming loose and rattling. The device can be produced at a relatively low cost and can be readily mounted on automobiles of various kinds.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. An actuating device for a rotatable headlight comprising a lower bearing member, an upper bearing member mounted in fixed spaced relation to said lower bearing member, one of said bearing members having an opening therethrough, means for mounting said bearing members on a supporting structure, a disk-like intermediate member arranged between the first mentioned bearing members and spaced therefrom to provide spaces to receive anti-friction devices, an axial stud secured to said intermediate bearing member and extending through said opening, means for connecting said stud with said headlight, and an actuating member connected with said stud.

2. An actuating device for a rotatable headlight comprising a shallow cylindrical housing, one of the end walls of which has an opening therethrough, means for mounting said housing on a supporting structure, a disk mounted within said housing for rotatory movement, an axial stud connected with said disk and extending through said opening, means for connecting said stud with said headlight, and an actuating member connected with said disk.

3. An actuating device for a rotatable headlight comprising a shallow cylindrical housing having upper and lower members, one of which has a circumferential flange to engage the other member and one of which has a central opening, a disk rotatably mounted within said housing, anti-friction members interposed between the respective sides of said disk and said upper and lower members, a stud secured to said disk and extending through said opening, an arm secured to said stud, means for connecting said stud with said headlight, and means for mounting said housing on a supporting structure.

4. The combination with an automobile comprising an axle and a transversely movable steering member, a supporting structure mounted on said automobile, and a headlight rotatably mounted on said supporting structure, of a bracket secured to said axle, a lower bearing member secured to said bracket, an upper bearing member mounted on the lower bearing member and spaced therefrom, an actuating member having a part extending loosely through said upper bearing member, an intermediate bearing member arranged between said upper and lower bearing members and rigidly connected with said actuating member, an operative connection between said actuating member and said steering member, and a means to connect said actuating member with said headlight.

5. The combination with an automobile comprising an axle and a transversely movable steering member, a supporting structure mounted on said automobile, and a headlight rotatably mounted on said supporting structure, of a bracket rigidly secured to said axle, a lower bearing member secured to said bracket, having a ball race in the upper face thereof and having a screw threaded peripheral portion, an upper bearing member having a ball race in the inner face thereof and having a depending flange screw threaded onto said lower bearing member, an actuating arm having a stud which extends loosely through said upper bearing member centrally thereof, an intermediate bearing member rigidly secured to said stud and arranged between said upper and lower bearing members, said intermediate bearing member having ball races opposed to the ball races in said upper and lower bearing members, balls mounted in the respective ball races, a means to connect said actuating arm with said headlight, and an operative connection between said actuating arm and said steering member.

6. A bearing comprising a lower member having a ball race in the upper face thereof and having a screw threaded peripheral portion, an upper bearing member having a central opening, a ball race formed in the inner face thereof concentrically with said opening, and a depending flange screw threaded onto said lower bearing member, a movable member arranged above said upper bearing member and having a stud extending loosely through the opening in said upper bearing member, an intermediate bearing member rigidly secured to said stud and arranged between said upper and lower bearing members, said intermediate bearing member having ball races in both faces thereof opposed, respectively, to the ball races in the upper and lower bearing members, and balls mounted in the respective ball races.

7. The combination with an automobile comprising an axle and a transversely movable steering member, a supporting structure mounted on said automobile, a bearing member carried by said supporting structure and having a ball race in the upper face thereof and an opening arranged centrally of said race, a headlight comprising a casing, a bearing member rigidly secured to said casing, having a ball race opposed to the ball race of the first mentioned bearing member and having a stud extending through the opening in said first mentioned bearing member, and balls mounted in said ball races, of an actuating device comprising a bearing member rigidly secured to said axle and having a ball race in the upper face thereof, a second bearing member arranged above said bearing member on said axle and having a ball race in the lower surface thereof, balls mounted in the last mentioned ball races, an arm rigidly secured to the last mentioned bearing member, means for operatively connecting said arm with said steering member, and a flexible member connected at one end with said stud and at the other end with said arm substantially in line with the axis thereof.

8. In a device of the character described, a supporting structure comprising a member having a vertically arranged socket and also having an upwardly extending part, a tubular bearing member mounted in said socket and having its upper end enlarged and provided with a ball race, a bearing member supported at the upper end of the upwardly extending part of said supporting structure and having its lower face provided with a ball race, a rotatable member arranged between said bearings and having its ends enlarged and provided with ball races opposed respectively to the ball races in the upper and lower bearing members, balls mounted in the respective ball races, a headlight arranged in front of and rigidly connected with said rotatable member, a part connected with said rotatable member and extending through said tubular bearing, and means for connecting said part with an actuating device.

9. In a device of the character described, a supporting structure comprising an upright member, a bearing member supported by said upright member near the lower end thereof and having an axial opening, a second bearing member supported by said upright member near the upper end thereof, arranged in line with the first mentioned bearing member and adjustable toward and from the same, a rotatable member arranged between said bearing members and having parts to cooperate therewith, means for mounting a headlight on said rotatable member for rotation therewith, and means connected with said rotatable member and extending through the opening in said lower bearing for imparting rotatory movement to said rotatable member and said headlight.

10. In a device of the character described, a supporting structure comprising an upright member having laterally extending portions near its respective ends, a bearing supported by the laterally extending portion at the lower end of said upright member, a bearing member screw threaded into the laterally extending portion at the upper end of said upright member, a nut to secure said upper bearing in adjusted positions, a rotatable member arranged between said bearing members and having parts to cooperate with the respective bearing members, a headlight carried by said rotatable member, and means for imparting rotatory movement to said rotatable member.

11. In a device of the character described, a supporting structure comprising an upright member having laterally extending portions arranged one above the other, a tubular bearing member supported in the lower lateral portion of said supporting structure, a bearing member having a stud screw threaded into the upper lateral portion of said supporting member, said bearing member having a downwardly extending flange, a nut mounted on said stud to secure said bearing member in adjusted positions, a rotatable member arranged between said bearing members and having at its lower end a bearing surface opposed to the lower bearing member and provided with a flange to embrace said lower bearing member, said rotatable member having at its upper end a bearing surface adapted to enter the flange on said upper bearing member, the upper lateral portion of said upright member being movable laterally in relation to the lower lateral portion thereof, a headlight carried by said rotatable member, and means for imparting rotatory movement to said rotatable member.

In testimony whereof, I affix my signature hereto.

GEORGE SHAFFER KECK.